(12) United States Patent
Hamann et al.

(10) Patent No.: US 11,300,707 B2
(45) Date of Patent: Apr. 12, 2022

(54) SOLAR FORECASTING USING MACHINE LEARNED CLOUDINESS CLASSIFICATION

(71) Applicant: INTERNATIONAL BUSINESS MACHINES CORPORATION, Armonk, NY (US)

(72) Inventors: Hendrik F. Hamann, Yorktown Heights, NY (US); Ildar Khabibrakhmanov, Syosset, NY (US); Younghun Kim, White Plains, NY (US); Siyuan Lu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 857 days.

(21) Appl. No.: 15/226,445

(22) Filed: Aug. 2, 2016

(65) Prior Publication Data
US 2018/0039891 A1 Feb. 8, 2018

(51) Int. Cl.
*G01W 1/10* (2006.01)
*G06N 20/00* (2019.01)
*G01W 1/12* (2006.01)

(52) U.S. Cl.
CPC ............... *G01W 1/10* (2013.01); *G01W 1/12* (2013.01); *G06N 20/00* (2019.01)

(58) Field of Classification Search
CPC .......... G01W 1/10; G01W 1/12; G06N 20/00; G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| | | | |
|---|---|---|---|
| 8,682,585 B1 | 3/2014 | Hoff | |
| 8,923,567 B2 | 12/2014 | Yao et al. | |
| 8,942,959 B2 | 1/2015 | Zhang et al. | |
| 10,103,548 B2 * | 10/2018 | He | H02S 50/10 |
| 2011/0282514 A1 | 11/2011 | Ropp et al. | |
| 2013/0054662 A1 | 2/2013 | Coimbra | |
| 2013/0166266 A1 | 6/2013 | Herzig et al. | |
| 2014/0136178 A1 | 5/2014 | Meagher et al. | |
| 2014/0324352 A1 | 10/2014 | Hamann et al. | |

(Continued)

FOREIGN PATENT DOCUMENTS

| | | |
|---|---|---|
| CN | 103761578 | 4/2014 |
| CN | 104573879 | 4/2015 |
| EP | 2891904 | 7/2015 |

OTHER PUBLICATIONS

Calbo, Josep et al. "A Method for Sky-Condition Classification from Ground-Based Solar Radiation Measurements", American Meteorological Society, Dec. 2001 (Year: 2001).*

(Continued)

*Primary Examiner* — Viker A Lamardo
(74) *Attorney, Agent, or Firm* — Tutuniian & Bitetto. P.C.; Erik Johnson

(57) ABSTRACT

Methods and systems for predicting irradiance include learning a classification model using unsupervised learning based on historical irradiance data. The classification model is updated using supervised learning based on an association between known cloudiness states and historical weather data. A cloudiness state is predicted based on forecasted weather data. An irradiance is predicted using a regression model associated with the cloudiness state.

20 Claims, 3 Drawing Sheets

(56) References Cited

U.S. PATENT DOCUMENTS

| | | | |
|---|---|---|---|
| 2015/0205008 A1 | 7/2015 | Ferrer | |
| 2015/0347922 A1 | 12/2015 | Hamann et al. | |
| 2017/0286838 A1* | 10/2017 | Cipriani | G06N 20/00 |
| 2018/0275314 A1* | 9/2018 | Pavlovski | G01W 1/10 |

OTHER PUBLICATIONS

Chen, Changsong et al. "Online 24-h solar power forecasting based on weather type classification using artificial neural network", Solar Energy 85, Sep. 13, 2011 (Year: 2011).*

Yang, Hong-Tzer et al. "A Weather-Based Hybrid Method for 1-Day Ahead Hourly Forecasting of PV Power Output", IEEE Transactions on Sustainable Energy, vol. 5, No. 3, Jul. 2014 (Year: 2014).*

Chen, Changsong et al. "Online 24-h solar power forecasting based on weather type classification using artificial neural network", Solar Energy 85, Sep. 13, 2011 (Year: 2011) (Year: 2011).*

Badescu V, Dumitrescu A. "New types of simple non-linear models to compute solar global irradiance from cloud cover amount." Journal of Atmospheric and Solar-Terrestrial Physics. Sep. 1, 2014;117:54-70. (Year: 2014).*

Alzahrani et al.—"Predicting Solar Irradiance Using Time Series Neural Networks"—2014—https://www.sciencedirect.com/science/article/pii/S1877050914013143 (Year: 2014).*

Huang et al.—"An analytical comparison of four approaches to modelling the daily variability of solar irradiance using meteorological records"—2014—https://www.sciencedirect.com/science/article/pii/S0960148114004017 (Year: 2014).*

Alanazi et al.—"Long-Term Solar Generation Forecasting"—May 2016—https://ieeexplore.ieee.org/abstract/document/7519883 (Year: 2016).*

Shao et al.—"Solar radiation forecast with machine learning"—Jul. 6-8, 2016—https://ieeexplore.ieee.org/stamp/stamp.jsp?tp=&arnumber=7543604&tag=1 (Year: 2016).*

Cheng et al.—"Very-short term forecast of global horizontal irradiance based on ground-based sky imager and lifted condensation level calculation"—2014—https://ieeexplore.ieee.org/stamp/stamp.jsp?tp=&arnumber=6991849 (Year: 2014).*

Richard Perez et al., Comparison of numerical weather prediction solar irradiance forecasts in the US, Canada and Europe, Solar Energy, Aug. 2013, pp. 305-326, vol. 94.

Siyuan Lu et al., Machine Learning Based Multi-Physical-Model Blending for Enhancing Renewable Energy Forecast—Improvement via Situation Dependent Error Correction, 2015 European Control Conference (ECC) Jul. 15-17, 2015. Linz, Austria.

Patrick Mathiesen et al., A high-resolution, cloud-assimilating numerical weather prediction model for solar irradiance forecasting, Solar Energy, Jun. 1, 2013.

* cited by examiner

SOLAR FORECASTING USING MACHINE LEARNED CLOUDINESS CLASSIFICATION

STATEMENT REGARDING FEDERALLY SPONSORED RESEARCH OR DEVELOPMENT

This invention was made with Government support under Contract No. DE-EE0006017 awarded by Department of Energy. The Government has certain rights in this invention.

BACKGROUND

Technical Field

The present invention generally relates to solar forecasting and, more particularly, to the use of machine learning in cloudiness classification.

Description of the Related Art

Solar power is the conversion of sunlight into electricity. Photovoltaic (PV) systems convert solar irradiance into useful electrical energy using the photovoltaic effect. However, substantial grid integration of solar power is a challenge, since solar power generation is intermittent and uncontrollable. While variability in solar output due to changes in the sun's position throughout the day and throughout the seasons is predictable, changes in ground-level irradiance due to clouds and local weather conditions creates uncertainty that makes modeling and predicting solar power generation difficult.

In a smart grid, grid operators strive to ensure that power plants produce the right amount of electricity at the right time, in order to consistently and reliably meet demand. Because the grid has limited storage capacity, the balance between electricity supply and demand is maintained at all times to avoid blackouts or other cascading problems. Grid operators typically send a signal to power plants every few seconds to control the balance between the total amount of power injected into the grid and the total power withdrawn. Sudden power generation shortfalls or excesses due to intermittency may necessitate more reserve power to quickly act to keep the grid balanced. Existing energy storage solutions, such as batteries, all have limitations that make their implementation on a large scale difficult.

SUMMARY

A method for predicting irradiance includes learning a classification model using unsupervised learning based on historical irradiance data. The classification model is updated using supervised learning based on an association between known cloudiness states and historical weather data. A cloudiness state is predicted based on forecasted weather data. An irradiance is predicted using a regression model associated with the cloudiness state using a processor.

A method for predicting irradiance includes learning a classification model using unsupervised learning based on historical irradiance data. The classification model is updated using supervised learning based on an association between known cloudiness states and historical weather data by comparing the predicted weather data to one or more criteria that are based on a measured or forecasted global horizontal irradiance. A cloudiness state is predicted based on forecasted weather data. An irradiance is predicted using a regression model associated with the cloudiness state using a processor. The regression model is based on a difference between the predicted irradiance and the clear sky irradiance if the cloudiness state is predicted to be overcast. The regression model is based on a predicted irradiance without considering the clear sky irradiance if the cloudiness state is predicted to be clear or partially cloudy.

A system for predicting irradiance includes an unsupervised learning module configured to learn a classification model using unsupervised learning based on historical irradiance data. A supervised learning module is configured to update the classification model using supervised learning based on an association between known cloudiness states and historical weather data. A classification module is configured to predict a cloudiness state based on forecasted weather data. A prediction module has a processor configured to predict an irradiance using a regression model associated with the cloudiness state.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide classification of sky cloudiness using supervised machine learning. This information can, in turn, be used to perform a regression on the weather information for a given day to provide a prediction of the solar output for that day. The classification of a day's cloudiness is used to determine a type of regression to perform so that an accurate prediction can be generated.

As a baseline, clear sky total irradiance at the surface of the Earth closely follows the irradiance at the top of the atmosphere of about 1362 W/m$^2$, but is attenuated by the absorption and scattering by gas molecules and aerosol particles in the atmosphere. Clear sky irradiance can be accurately calculated based on the zenith and azimuth angles of the sun, climatological atmospheric conditions, and aerosol particle density. During times of clear skies, the irradiance measured at the Earth's surface does not change significantly as gas molecules and particles can be modeled as being uniformly distributed in the atmosphere.

In contrast, clouds provide significant and uneven attenuation of solar radiation. Moreover, as clouds move in and out of the path of sunlight, solar irradiance measured at the Earth's surface changes significantly over time. As a result, the deviations from clear sky irradiance values can be characterized for any given time window to classify whether the sky is clear, partially cloudy, or overcast/raining.

The degree of cloudiness affects the prediction of solar irradiance in the present embodiments by determining how the prediction should be calculated. As will be discussed in greater detail below, different types of regression apply to each of the cloudiness classifications, generating different predictions for irradiance. During training, the cloudiness of the sky is classified directly using measurements of total solar irradiance or measured irradiance. The determination of the sky's cloudiness state then uses a set of physical rules to classify the cloudiness condition with forecasted irradiance. The supervised machine learning model is used to correct forecasted cloudiness classifications using additional weather information such as, e.g., humidity, temperature, pressure, etc. The regression that is performed works on the difference between the irradiance and the expected clear sky irradiance—this is a smaller value and thus can be predicted with less bias.

Figure 1:
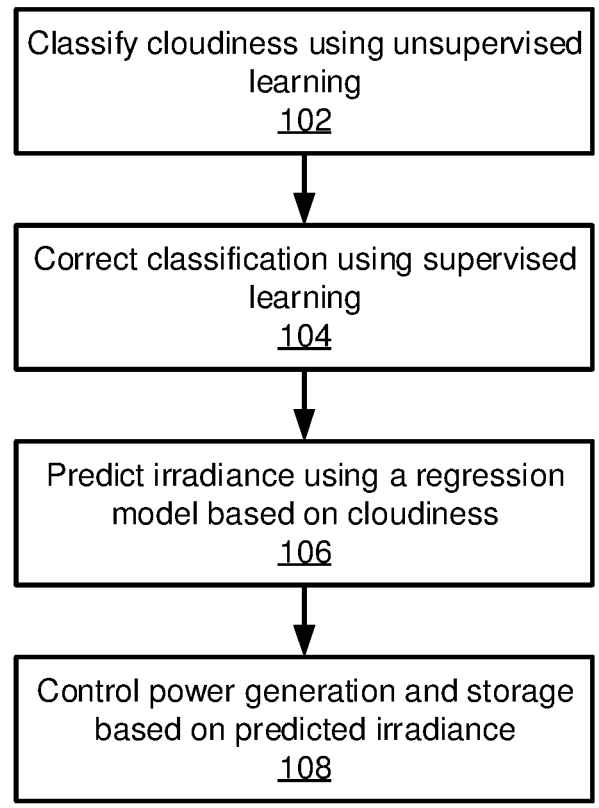
FIG. 1 is a block/flow diagram of a method for predicting irradiance in accordance with the present principles.

Referring now to FIG. 1, a method for predicting irradiance is shown. Block 102 uses unsupervised learning to generate a classification of sky cloudiness levels. Block 102 may employ, for example, clustering of irradiance measurements to identify irradiance levels and patterns of irradiance levels that correspond to clear skies, to partially cloudy skies, and to overcast skies. This unsupervised learning may employ deterministic physical rules. Unsupervised machine learning refers to a class of problems in which one seeks to determine how data is organized. It is distinguished from supervised learning in that the model being generated is given only unlabeled examples. Clustering is an example of unsupervised learning.

Cluster analysis, or clustering, is the task of grouping a set of objects in such a way that objects in the same group, called a cluster, are more similar in some sense to each other than to those in other groups. Clustering is a common technique in statistical data analysis, and is used in fields such as machine learning, pattern recognition, image analysis, and information retrieval. Methods for clustering vary according to the data being analyzed. One type of clustering that is often used in data mining is k-means clustering, in which a dataset is partitioned into a predetermined number, k, of clusters. Another type of clustering is two-step clustering, with which an optimal number of clusters may be automatically determined.

Block 104 then corrects the classification of block 102 using supervised learning based on historical weather measurements and cloudiness measurements. Historical information may include the National Solar Radiation Database maintained by the National Renewable Energy Laboratory. This database includes, for example, 30-minute solar and meteorological data for approximately two million 0.038° longitude surface pixels.

The supervised learning may employ a set of different criteria based on, e.g., measured or forecasted global horizontal irradiance $GHI_i$ measured at a time $t_i$ and computed clear sky global horizontal irradiance $GHI_i^{Clear}$ measured at $t_i$.

One such criterion, $\Delta \overline{G}$, measures the difference between the average $GHI_i$ and the average clear sky $GHI_i^{Clear}$. This discriminates well between clear sky and cloudy periods, because the GHI is far less during cloudy periods than during times of clear skies:

$$\Delta \overline{G} = \frac{1}{n}\sum_{i=1}^{n} GHI_i^{Clear} - \frac{1}{n}\sum_{i=1}^{n} GHI_i$$

A second criterion finds the maximum measured $GHI_i$ value during a time period and computes the difference between the corresponding calculated clear sky irradiance and the measured $GHI_i$. On a partially cloudy day, the average irradiance can be close to that of sunny days due to the effective oscillations in $GHI_i$ as the clouds move in and out, making the first criterion ineffective. On a clear sky, the difference is close to zero and on an overcast day the difference is usually a large positive number, while on partially cloudy days the difference becomes negative, as partial cloudiness may enhance irradiance at the earth surface. The second criterion is therefore determined as:

$$\Delta M = GHI_m^{Clear} - M, M = \max(GHI_i)$$

where m is the time value where $GHI_i$ is at a maximum.

A third criterion measures the length of the curve of solar irradiance plotted against time. This criterion is helpful because the GHI profile will be more variable with moving clouds than when the skies are clear. Thus, the length of the curve on a clear day will be shortest, whereas cloudy days will have ups and downs that increase the length of the curve. The third criterion can therefore be measured as:

$$\Delta L = \sum_{i=1}^{n}\left(\sqrt{\left(\frac{GHI_{i+1}}{I_0} - \frac{GHI_i}{I_0}\right)^2 + \left(\frac{t_{i+1}}{\Delta t} - \frac{t_i}{\Delta t}\right)^2} - \sqrt{\left(\frac{GHI_{i+1}^{Clear}}{I_0} - \frac{GHI_i^{Clear}}{I_0}\right)^2 + \left(\frac{t_{i+1}}{\Delta t} - \frac{t_i}{\Delta t}\right)^2}\right)$$

where $I_0$ is the total irradiance measured at the top of the atmosphere and $\Delta t$ is a measurement time interval (e.g., one hour).

A fourth criterion distinguishes between a small number of variations with large deviations from clear sky (e.g., a few thick clouds) and a large number of small oscillations around the clear sky value (e.g., many smaller clouds). This may be measured as a standard deviation of the slope of the time profile:

$$\sigma = \sqrt{\frac{1}{n-1}\sum_{i=1}^{n}\left(GHI_{i+1} - GHI_i - \frac{GHI_n - GHI_1}{n-1}\right)^2} \bigg/ \left(\frac{1}{n}\sum_{i=1}^{n} GHI_i\right)$$

A fifth criterion is similar to the second criterion, but also measures a degree of variability. This criterion compares the slopes of measured irradiance and clear sky irradiance at subsequent time intervals. The maximum difference for a time window is then reported as follows:

$$S = \max\{|(GHI_{i+1} - GHI_i) - (GHI_{i+1}^{clear} - GHI_i^{clear})|\}$$

The criteria can be considered sequentially. For example, an early criterion might rule out certain cloudiness states while leaving other options possible. A subsequent criterion might then be applied to provide greater resolution on the actual cloudiness state. Following the exemplary criteria listed above, ranges for each value may be found that represent different cloudiness states. The table below provides an exemplary classification, with ranges of values for each criterion corresponding to different cloudiness states.

|  | Clear | Partially cloudy | Overcast |
| --- | --- | --- | --- |
| $\Delta \overline{G}$ | <75 W/m² | 75 to 300 W/m² | >300 W/m² |
| $\Delta M$ | <75 W/m² | 75 to 300 W/m² | >300 W/m² |
| $\Delta L$ | Less than 1 | Greater than 4 | 1 to 4 |
| $\sigma$ | Less than 0.005 | Greater than 0.02 | 0.005 to 0.02 |
| S | Less than 8 | Greater than 32 | 8 to 32 |

It should be noted that the above criteria are provided for the sake of illustration. Additional criteria for classifying cloudiness can be obtained by, for example, replacing GHI by direct normal irradiance (DNI) and diffuse horizontal irradiance (DHI). DNI is solar radiation that comes in at a straight line from the direction of the Sun at its current position in the sky. DHI, meanwhile, is the solar radiation that does not arrive on a direct path from the sun but has been scattered by molecules and particles in the atmosphere. DHI generally comes equally from all directions. The relationship between GHI and DNI is GHI=DNI×cos(θ)+DHI, where θ is the solar zenith angle.

In addition, classification can be obtained from other sources, for example using surface weather maps which plot atmospheric fronts. In one example, a high pressure region on the weather map may be associated with clear sky, while advancing cold fronts are likely to create overcast skies. Any appropriate criteria may therefore be used for the supervised learning.

The unsupervised learning provides for the creation of labels on training data based on the results of, e.g., clustering. Each of the labels represents some distinct state of the cloudiness of the atmosphere. The labels are then used to correlate to weather state parameters in block 104.

Once the corrected classification model has been generated by block 104, block 106 predicts the irradiance for a given day. This prediction includes performing a regression using the predicted weather features for the day. As noted above, the particular form of the regression will depend on the cloudiness classification. In particular, the regression model can be determined based on historical measurements of irradiance $I_m$ and a weather model prediction for irradiance $I_p$ or other meteorological parameters. In a first regression model:

$$I_m \sim I_p, T, V \ldots$$

where $I_m$ is approximated by a function of $I_p$, temperature T and wind speed V are other parameters predicted by the weather model. Block 106 uses this first regression model for overcast/rainy skies, whereas the following second regression model is used for clear and partially cloudy days:

$$(I_{clear} - I_m) \sim (I_{clear} - I_p), T, V \ldots$$

where $I_{clear}$ is the clear sky irradiance. In the second model, the small value of the difference to the background of large diurnal variations of clear sky irradiance is modeled to achieve adequate representation of the approximation error. Block 108 then makes power control decisions (e.g., storing or discharging power at a storage facility or turning on additional power sources) based on the predicted irradiance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
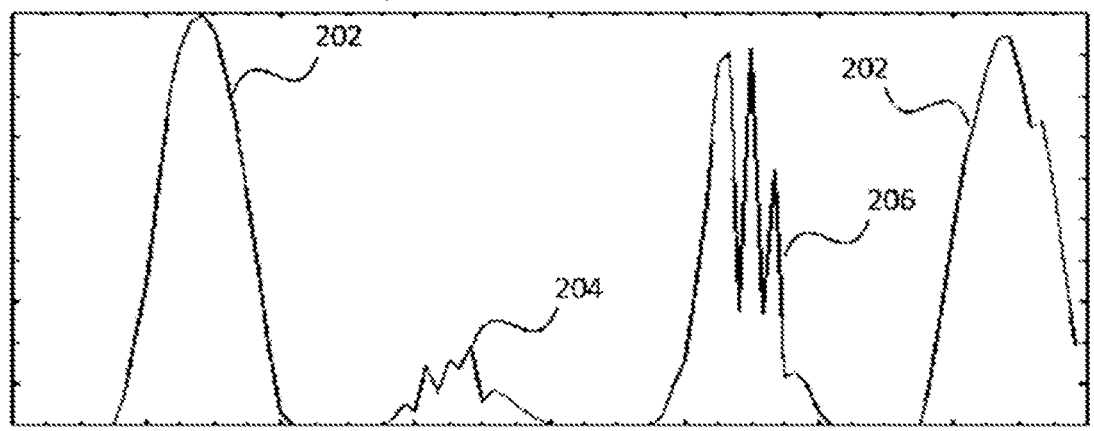
FIG. 2 is a diagram of different irradiance patterns based on cloudiness state in accordance with the present principles.

Referring now to FIG. 2, an example of several irradiance curves is shown. The vertical axis measures diffuse normal irradiance and the horizontal axis measures time, with the plotted lines representing GHI for a given day. Curves 202 represent days with relatively clear skies—the GHI reaches or nearly reaches its maximum with little variation over the course of the day. The second curve 204 represents an overcast day, where the maximum GHI is much lower as a result of heavy cloud cover. The third curve 206 represents a partially cloudy day, with large changes in irradiance that result from the passage of clouds overhead.

Figure 3:
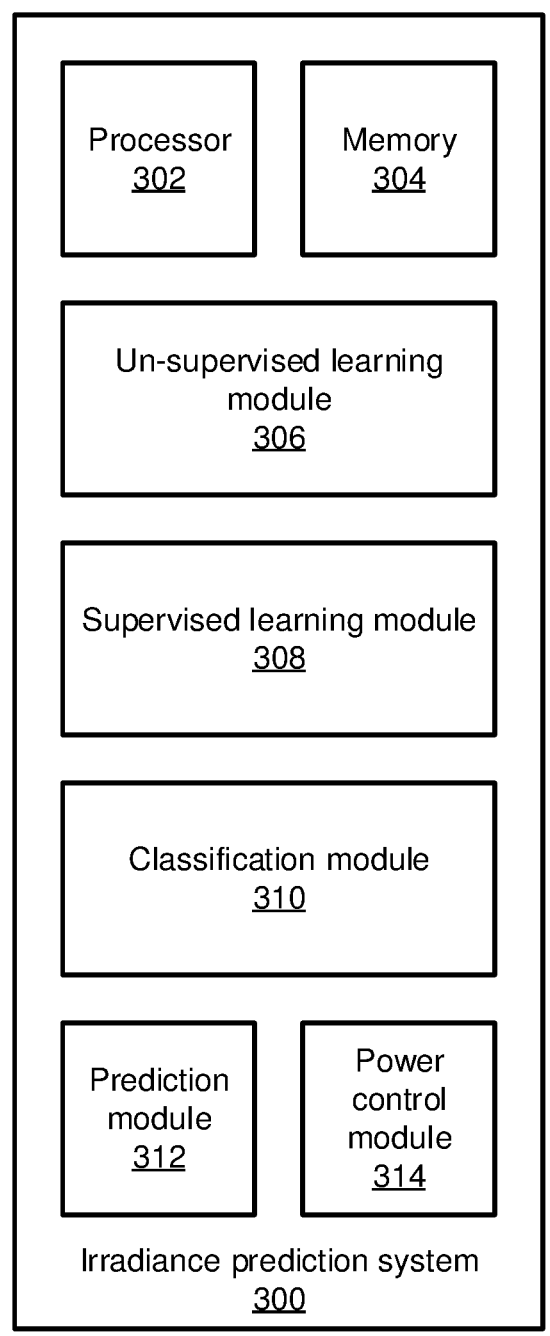
FIG. 3 is a block diagram of a system for predicting irradiance in accordance with the present principles.

Referring now to FIG. 3, a system 300 for irradiance prediction is shown. The system 300 includes a hardware processor 302 and memory 304. The system may further include one or more functional modules that may be implemented as software that is stored in memory 304 and executed by processor 302. In alternative embodiments, the functional modules may be implemented as one or more discrete hardware components in the form of, e.g., application specific integrated chips or field programmable gate arrays.

For example, the system 300 includes an unsupervised learning module 306 that creates a classification model based on historical weather data and a supervised learning module 308 that updates the classification model based on training data that includes cloudiness classifications. A classification module 310 uses the classification model to determine, based on predictions of various weather data, what the cloudiness state of the sky will be. A prediction module 312 uses this infoiniation to determine what the likely irradiance will be using a regression model that is selected based on the cloudiness. Power control module 314 then makes power control decisions (e.g., storing or discharging power at a storage facility or turning on additional power sources) based on the expected irradiance.

Figure 4:
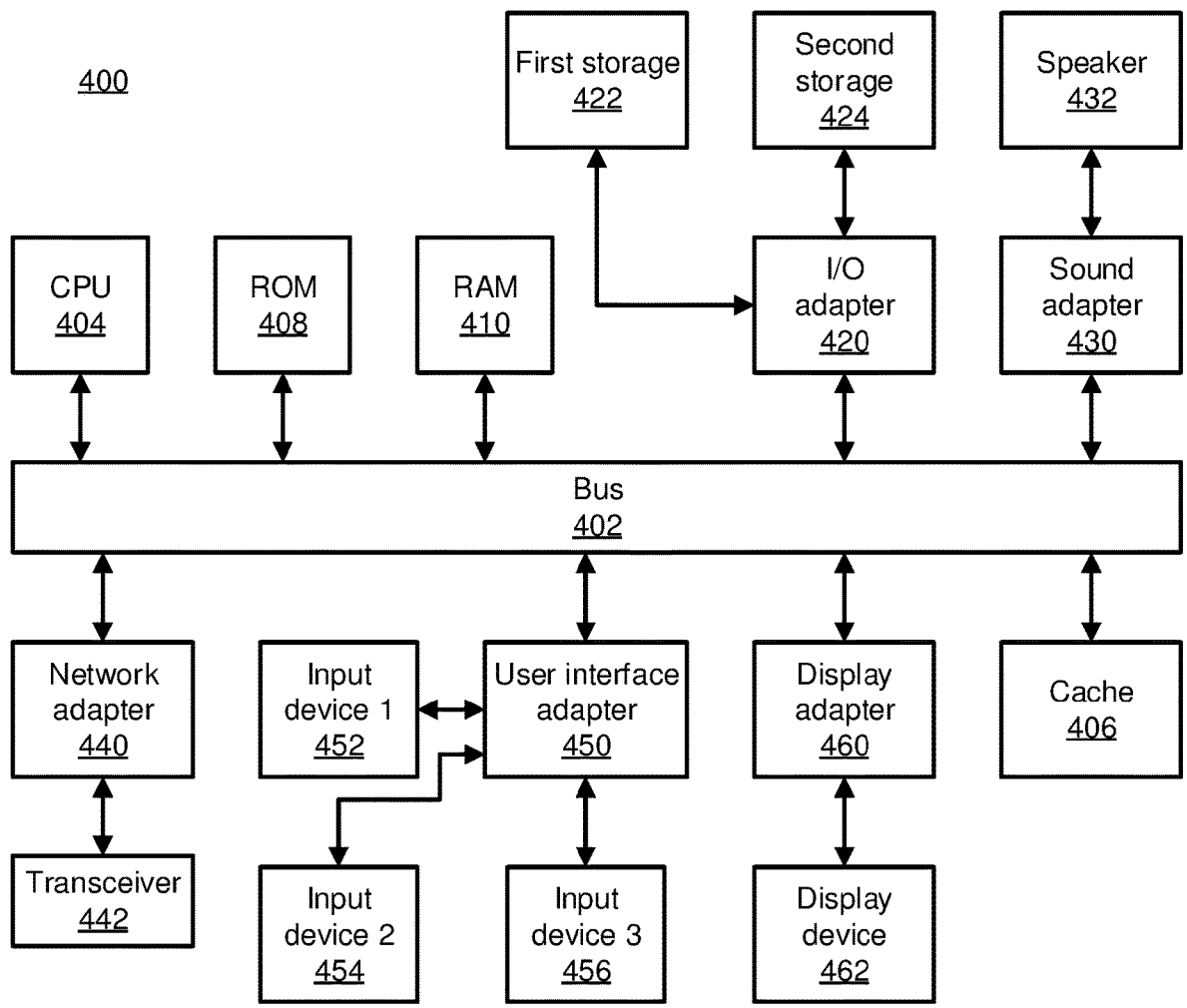
FIG. 4 is a block diagram of a processing system in accordance with the present principles.

Referring now to FIG. 4, an exemplary processing system 400 is shown which may represent the irradiance prediction system 300. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Having described preferred embodiments of solar forecasting using machine learned cloudiness classification (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for predicting irradiance, comprising:
   training a classification model using historical irradiance data for an initial cloudiness classification, using unsupervised learning;
   updating the cloudiness classification model using supervised learning based on one or more criteria that include a difference between a clear sky global horizontal irradiance (GHI) and a measured GHI;
   predicting that a cloudiness state is clear or partially cloudy, based on forecasted weather data and the updated cloudiness classification model; and
   predicting an irradiance using a regression model using a processor, responsive to predicting that the cloudiness state is clear or partially cloudy.

2. The method of claim 1, wherein the regression model is based on a predicted irradiance, without considering the clear sky irradiance, if the cloudiness state is predicted to be overcast.

3. The method of claim 1, wherein predicting the cloudiness state comprises comparing predicted weather data to the one or more criteria.

4. The method of claim 3, wherein the one or more criteria are based on direct normal irradiance and diffuse horizontal irradiance.

5. The method of claim 1, wherein the one or more criteria are selected from a group consisting of a subtraction between average GHI and average clear sky GHI, a subtraction between a clear sky irradiance and a measured maximum GHI, and a standard deviation of a slope of the curve of solar irradiance.

6. The method of claim 1, wherein the cloudiness state is predicted to be one from the group consisting of, "clear," "overcast," and, "partially cloudy."

7. The method of claim 1, wherein the regression model is based on a predicted temperature.

8. The method of claim 1, wherein the one or more criteria include the difference $\Delta \overline{G}$ between the average GHI and the average clear sky GHI, measured as:

$$\Delta \overline{G} = \frac{1}{n}\sum_{i=1}^{n} GHI_i^{Clear} - \frac{1}{n}\sum_{i=1}^{n} GHI_i$$

where n is a number of measurements, $GHI_i^{Clear}$ is a measurement of clear sky GHI, and $GHI_i$ is a measurement of GHI.

9. The method of claim 1, wherein the one or more criteria include a difference $\Delta M$ between a clear sky irradiance and a measured maximum GHI, measured as:

$$\Delta M = GHI_m^{clear}$$

where m is a time value where the maximum GHI is measured, $GHI_m^{Clear}$ is a clear sky GHI at the time in, and where M is the measured maximum GHI.

10. The method of claim 1, wherein the one or more criteria include a length $\Delta L$ of a curve of solar irradiance plotted against time, measured as:

$$\Delta L = \sum_{i=1}^{n}\left(\sqrt{\left(\frac{GHI_{i+1}}{I_0} - \frac{GHI_i}{I_0}\right)^2 + \left(\frac{t_{i+1}}{\Delta t} - \frac{t_i}{\Delta t}\right)^2} - \sqrt{\left(\frac{GHI_{i+1}^{Clear}}{I_0} - \frac{GHI_i^{Clear}}{I_0}\right)^2 + \left(\frac{t_{i+1}}{\Delta t} - \frac{t_i}{\Delta t}\right)^2}\right)$$

where n is a number of measurements, $GHI_i$ is a measured GHI value, $t_i$ is a time of an measurement, $\Delta t$ is a measurement time interval, and $I_o$ is a total irradiance measured at the top of the atmosphere.

11. The method of claim 1, wherein the one or more criteria include a standard deviation $\sigma$ of a slope of a curve of solar irradiance, measured as:

$$\sigma = \sqrt{\frac{1}{n-1}\sum_{i=1}^{n}\left(GHI_{i+1} - GHI_i - \frac{GHI_n - GHI_1}{n-1}\right)^2} \Bigg/ \left(\frac{1}{n}\sum_{i=1}^{n} GHI_i\right)$$

where n is a number of measurements and $GHI_i$ is a measured GHI value.

12. The method of claim 1, wherein the one or more criteria include a comparison S of slopes of measured irradiance and clear sky irradiance at subsequent time intervals, measured as:

$$S = \max\{|(GHI_{i+1}-GHI_i)-(GHI_{i+1}^{clear}-GHI_1^{clear})|\}$$

where $GHI_i$ is a measured GHI value and where $GHI_i^{Clear}$ is measured clear sky GHI value.

13. The method of claim 1, wherein updating the cloudiness classification model uses supervised learning based on a plurality of criteria, determined sequentially.

14. A system for predicting irradiance, comprising:
a hardware processor; and
a memory, operatively connected to the hardware processor, that stores computer program code that is executed by the hardware processor, wherein the computer program code includes:
an unsupervised learning module configured to train a classification model using historical irradiance data for an initial cloudiness classification;
a supervised learning module configured to update the initial cloudiness classification using supervised learning based on one or more criteria that include a difference between a clear sky global horizontal irradiance (GHI) and a measured GHI;
a classification module configured to predict that a cloudiness state is clear or partially cloudy, based on forecasted weather data and the updated cloudiness classification model; and
a prediction module comprising a processor configured to predict an irradiance using a regression model, responsive to predicting that the cloudiness state is clear or partially cloudy.

15. The system of claim 14, wherein the regression model is based on a predicted irradiance, without considering the clear sky irradiance, if the cloudiness state is predicted to be overcast.

16. The system of claim 14, wherein the classification module is further configured to predict the cloudiness state by comparing predicted weather data to the one or more criteria.

17. The system of claim 16, wherein the one or more criteria are based on direct normal irradiance and diffuse horizontal irradiance.

18. The system of claim 14, wherein the one or more criteria are selected from a group consisting of a subtraction between average GHI and average clear sky GHI, a subtraction between a clear sky irradiance and a measured maximum GHI, and a standard deviation of a slope of the curve of solar irradiance.

19. The system of claim 14, wherein the cloudiness state is predicted to be one from the group consisting of, "clear," "overcast," and, "partially cloudy."

20. A method for predicting irradiance, comprising:
training a classification model using historical irradiance data for an initial cloudiness classification, using unsupervised learning;
updating the cloudiness classification model using supervised learning based on one or more criteria that include a slope of a curve of measured irradiance versus time;
predicting that a cloudiness state is clear or partially cloudy, based on forecasted weather data and the updated cloudiness classification model; and
predicting an irradiance using a regression model using a processor, responsive to predicting that the cloudiness state is clear or partially cloudy.

* * * * *